United States Patent

Araki et al.

[11] Patent Number: 6,154,492
[45] Date of Patent: Nov. 28, 2000

[54] MOTION VECTOR DETECTION APPARATUS

[75] Inventors: Toshiyuki Araki, Osaka; Katsuji Aoki, Kanagawa, both of Japan

[73] Assignee: Matsushita Electric Industrial Co., Ltd., Osaka, Japan

[21] Appl. No.: 09/004,414

[22] Filed: Jan. 8, 1998

[30] Foreign Application Priority Data

Jan. 9, 1997 [JP] Japan .................................... 9-002028

[51] Int. Cl.⁷ .................................................... H04N 7/32
[52] U.S. Cl. ............................... 375/240.16; 375/240.24
[58] Field of Search ..................................... 348/384, 390, 348/400–402, 407, 409–413, 415, 416, 420, 699; 375/240, 240.01, 240.12, 240.16, 240.24; 382/232, 236, 238; 708/524; H04N 7/32

[56] References Cited

U.S. PATENT DOCUMENTS

| | | |
|---|---|---|
| 4,622,632 | 11/1986 | Tanimoto et al. . |
| 4,860,248 | 8/1989 | Lumelsky . |
| 5,235,536 | 8/1993 | Matsubishi et al. .................... 708/524 |
| 5,357,287 | 10/1994 | Koo et al. ................................ 348/413 |
| 5,477,278 | 12/1995 | Kitaura et al. .......................... 348/699 |
| 5,512,962 | 4/1996 | Homma .................................. 348/699 |
| 5,696,836 | 12/1997 | Yoshino et al. ......................... 348/699 |
| 5,719,642 | 2/1998 | Lee ......................................... 348/699 |
| 5,778,099 | 7/1998 | Suzuki ................................... 348/409 |
| 5,838,827 | 11/1998 | Kobayashi et al. ..................... 348/416 |
| 6,058,142 | 5/2000 | Ishikawa et al. ....................... 348/416 |

FOREIGN PATENT DOCUMENTS

| | | |
|---|---|---|
| 0 639 926 | 2/1995 | European Pat. Off. . |
| 04065985 | 3/1992 | Japan . |
| 07184210 | 7/1995 | Japan . |
| 96/32807 | 10/1996 | WIPO . |

OTHER PUBLICATIONS

Ki–Chul Nam et al: "A Full–search block–matching algorithm with early retirement of processing elements" Journal of the Korean Institute of Telematics and Electronics, Nov. 1995, South Korea, vol. 32B, No. 11, pp. 53–59, XP002091846, Abstract (Only Translation).

Yin Chan et al: "Bit level block matching systolic arrays", Proc. the Intl. Conf. on Application Specific Array Processors, Strasbourg, France, Jul. 24–26, 1995, pp. 214–221, XP002091845, Abstract.

*Primary Examiner*—Richard Lee
*Attorney, Agent, or Firm*—McDermott, Will & Emery

[57] ABSTRACT

In a motion vector detection apparatus, cascade-connected processor elements each calculates the absolute value of the difference between each of a plurality of pixels which compose a picture and a corresponding one of the same number of pixels included in a block, and also performs cumulative addition of the difference absolute values in the block. These operations are performed for each of the blocks within the predetermined search area. A comparative device repeatedly compares the cumulative addition values of two blocks obtained sequentially in the processor element at the final stage, and selects the smaller one of the cumulative addition values. A subtracter compares the smaller cumulative addition value with a setting value. When the smaller cumulative addition value is smaller than the setting value, a control circuit halts the supply of clock signals to the processor elements and the comparison device, so as to halt the entire operations of the apparatus. Consequently, the power consumption can be reduced.

10 Claims, 9 Drawing Sheets

| | CLK-A | CLK-B |
|---|---|---|
| MODE=0 |  |  |
| MODE=1 |  |  |

STAGE NUMBERS OF PROCESSOR ELEMENTS

MOTION VECTOR DETECTION APPARATUS

BACKGROUND OF THE INVENTION

The present invention relates to an improvement of a motion vector detection apparatus which detects motion vectors used for the prediction in motion compensation prediction, which is one of the motion picture compression techniques.

In transmitting and storing motion picture having a large amount of data, the motion picture compression techniques are inevitable to reduce the large amount of data. The motion picture compression techniques include a compression technique called motion compensation prediction. According to the motion compensation prediction, the level of data redundancy in motion picture is lowered in the direction of the time axis by extracting the displacement between two highly-correlated pictures, so as to compress the amount of data. The displacement between the highly-correlated pictures in the motion compensation is referred to as a motion vector, which is generally detected by a block matching method. The block matching method is briefly described with reference to FIG. 5.

The block matching method is a method of evaluating the correlation between two pictures in predetermined block units. In FIG. 5, when a motion vector for a block (previous picture) 502 on Picture A 501 is detected, an evaluation value is calculated for each one of a plurality of blocks within a predetermined search area 504 on Picture B 503. As a result of the calculation, when block X 505 shown in FIG. 5 has turned out to have the best evaluation value (the highest correlation), the displacement from the position on Picture B 503 on which the previous picture block 502 is projected to block X 505 is detected as a motion vector 506.

As the evaluation value indicative of the degree of correlation, a total sum is generally used which is obtained by cumulatively adding the absolute value of the difference between each of the pixels included in a block and a spatially corresponding one of the same number of pixels included in another block. As the evaluation value is smaller, the two blocks have a smaller difference, that is, higher correlation.

As a conventional motion vector circuit for detecting motion vectors by the above-mentioned block matching method, there is a well-known technique disclosed in Japanese Laid-Open Patent Application No. 7-184210.

FIG. 1 shows the entire structure of a motion vector detection apparatus, where one block includes 256 pixels, and each pixel has an 8-bit value. The apparatus shown in FIG. 1 includes cascade-connected processor elements (hereinafter PEs) 601 which are as many as the pixels included in one block: 256, a bus R 602 for transferring the pixel data of one block within the search area 504, a bus S 603 for transferring the pixel data of the previous picture block 502, a clock line 604 for supplying each of the PEs 601 with an operation clock, and a comparison means 605 for receiving an output of the PE at the final stage and comparing the previous value and the current value of the output.

FIG. 9 show the conventional internal structure of each of the PEs 601 in the above-mentioned motion vector detection apparatus. The apparatus shown in FIG. 9 includes a difference absolute value calculator 610 for calculating the absolute value of the difference of the pixel data to be transferred via the bus R 602 and the bus S 603, an adder 611 for adding an output value of the difference absolute value calculator 610 and an output value of the PE at the previous stage together and for outputting the addition results to the PE at the following stage, a register 612 for storing the pixel data of the previous picture block to be transferred via the bus S 603, a pipeline register 613 for pipeline processing the calculations of the difference absolute value calculator 610 and the adder 611, and a pipeline register 614 for pipeline processing the calculation of the adder 611 of each of the PEs 601.

The operations of the above-mentioned motion vector detection apparatus will be described as follows. The leading pixel data in the previous picture block 502 are stored in the register 612 and then transferred to the difference absolute value calculator 610 in the PE at the first stage (PE0). Also, the leading pixel data of a block (for example, block X 505) within the search area 504 are transferred to the difference absolute value calculator 610 in the PE at the first stage. The difference absolute value calculator 610 calculates the difference absolute value between the received two pixel data, and transfers the calculation results to the pipeline register 613. The adder 611 receives the difference absolute value from the register 613 and transfers it to the pipeline register 614 at the following stage, so that the difference absolute value is transferred to the PE at the next stage (PE1).

Then, the second pixel data following the above-mentioned leading pixel data in the previous picture block 502 are transferred to the PE at the second stage (PE1). Also, the next pixel data in the block X 505 within the search area 504 are transferred to the PE at the second stage. In the PE at the second stage, the difference absolute value between these two pixel data is calculated and the results are stored in the pipeline register 613 in the same manner as in the PE at the first stage. Further more, in the PE at the second stage, the adder 611 adds the difference absolute value of the leading pixel data transferred from the PE at the first stage and the difference absolute value of the second pixel data together. The results are stored in the pipeline register 614 and then transferred to the PE at the third stage (PE2).

These operations are repeated hereafter until the total sum of the difference absolute values between all the pixels in the previous picture block 502 and in block X 505 within the search area 504 is obtained in the PE at the final stage (PE255).

These operations are sequentially performed for every block within the search area 504 although FIG. 5 shows only one other block Y 507.

The comparison means 605 receives the total sum of the difference absolute values outputted from the PE at the final stage, compares the total sum in the previous block (for example, block X 505) and the total sum in the current block (for example, block Y 507), and chooses the smaller of the two total sums. When the total sums of the difference absolute values in all the blocks within the search area 504 have been calculated and compared, the comparison means 605 obtains the smallest total sum, and outputs, as a motion vector, the displacement between the block having the smallest total sum and the previous picture block 502.

However, the above-mentioned conventional motion vector detection apparatus has drawbacks of demanding huge power consumption because of a large amount of calculation processing needed and of requiring large circuit scales. These drawbacks will be detailed as follows.

In FIG. 5, Picture A 501 is one of the 30 pictures displayed in one second and its size is 720 pixels×480 lines in the case of standard TV motion picture. Since the standard size of the previous picture block 502 is 16 pixels×16 lines in the motion vector detection used for the motion compensation prediction of the motion picture compression, the number of blocks included within the search area 504 amounts to 1024. Under these conditions, the number of blocks subject to the block matching amounts to 40,500 (=720×480×30÷16÷16) per second. A block matching performed for each block requires 262,144 (=1,024×16 ×16) times of calculations for the difference absolute values and the total sums. Consequently, the motion vector detection by the block matching method requires as many as 10,616,832,000 (=40,500×262,144) times of calculates per second for the difference absolute values and the total sums, which demands huge power consumption.

In order to perform the calculations of the difference absolute values and the addition of these difference absolute values (total sum) with a high precision, it is necessary to make the difference absolute value calculator, the adder, the pipeline register, and other units in each PE have large bit widths. It is also inevitable to provide as many as 256 PEs each including these units, which leads to undesirable expansion of the circuit scales.

SUMMARY OF THE INVENTION

The object of the present invention is to provide a motion vector detection apparatus which has reduced circuit scales and detects motion vectors with low power consumption.

In order to achieve the object, the present invention has the following features. In the motion compensation prediction, when a motion vector is a displacement between the previous picture block and a block which has sufficiently high correlation with the previous picture block, even if it is not the block having the highest correlation, the level of data redundancy between the pictures can be lowered sufficiently and motion pictures can be compressed at a high compression rate.

These features bring about the following effects. Firstly, in calculating the evaluation values of a plurality of blocks within a search area, if it is possible to obtain an evaluation value which is not the best, but is as good as the best evaluation value, in other words, if the evaluation value does not need to have a precision (resolution) higher than indicating the level of correlation, the bit width of the adder and other units in each PE can be reduced, and accordingly both the circuit scales and the power consumption can be reduced.

Secondly, in calculating the total sum of the difference absolute values of pixels with the use of a plurality of PEs, a predetermined setting value (threshold value) can be set as the addition results of the adder in each PE, and when calculated addition results exceed the setting value, that is, when low correlation can be predicted before the total sum is obtained, the useless addition processing of the difference absolute values in the remaining PEs can be halted. As a result, the power consumption can be reduced.

Thirdly, when a block having sufficiently high correlation with the previous picture block is detected, it is unnecessary to detect a block having higher correlation. Therefore, the calculation of the evaluation values hereafter can be halted, which accordingly decreases the number of calculations, and reduces the consumption power.

In the conventional motion vector detection apparatus, the adder 611 on each of PE0–PE255 has a bit width which can express the largest total sum of the difference absolute values obtained in the PE at the final stage. However, the adder 611 adds the difference absolute value calculated in the PE at the present stage to the difference absolute value obtained by the adder 611 in the PE at the previous stage, that is, the total sum of the difference absolute values calculated so far. Therefore, the adder 611 in a PE at a later stage calculates a larger total sum, while the adder 611 in a PE at an earlier stage can manage with a smaller bit width. As a result, it is possible to make the adder 611 in a PE at an earlier stage have a smaller bit width, so as to reduce the circuit scale.

In view of these aspects, the motion vector detection apparatus of the present invention for detecting correlation between a picture consisting of a plurality of pixels and a plurality of blocks each consisting of the same number of pixels as the picture, the plurality of blocks being included within a predetermined search area containing a larger number of pixels than the picture is characterized by comprising: a plurality of PEs which are cascade-connected, each of the PEs calculating a difference absolute value between each of the plurality of pixels included in the picture and a corresponding one of pixels included in every one of the plurality of blocks, and performing cumulative addition of the difference absolute values for every one of the plurality of blocks sequentially; a comparison means for repeatedly comparing cumulative addition values of the difference absolute values of two of the plurality of blocks by subtraction, the cumulative addition values being obtained in the PE at a final stage, and for repeatedly selecting the smaller cumulative addition value; and a restriction means for placing restrictions on calculation of at least one of the comparison means and the plurality of PEs, so as to give a cumulative addition value finally obtained in the comparison means a possibility of becoming a sufficiently small cumulative addition value even if the cumulative addition value is not smallest.

The above-mentioned motion vector detection apparatus of the present invention is also characterized in that each of the plurality of PEs comprises: a difference absolute value calculation means for calculating the difference between each of the plurality pixels included in the picture and a corresponding one of pixels contained in one of the plurality of blocks, and further calculating the absolute value of the difference, so as to obtain a difference absolute value having a predetermined number of bits; an addition means for adding the difference absolute value obtained by the difference absolute value calculation means and an output of the PE at the previous stage together, and for transferring addition results to the PE at the next stage; and the restriction means being composed of a processing means for truncating or rounding predetermined low-order bits of the difference absolute value obtained by the difference absolute value calculation means, so as to obtain the difference absolute value having high-order bits.

The above-mentioned motion vector detection apparatus of the present invention is also characterized in that each of the plurality of PEs comprises: a difference absolute value calculation means for calculating the difference between each of the plurality pixels included in the picture and a corresponding one of pixels contained in one of the plurality of blocks, and further calculating the absolute value of the difference, so as to obtain a difference absolute value; an addition means for adding the difference absolute value obtained by the difference absolute value calculation means and an output of the PE at the previous stage together, and for transferring addition results to the PE at the next stage, the addition means being composed of a calculator whose bit width is small; and the restriction means comprising the calculator which composes the addition means and a forced halt means for forcibly halting the cumulative addition of the difference absolute values in the PEs at the following stages when a value calculated by the calculator is larger than the maximum value which can be expressed with the bit width.

The above-mentioned motion vector detection apparatus of the present invention is also characterized in that the calculator whose bit width is small is composed of a calculator which outputs an overflow signal when a calculated value is larger than the maximum value which can be expressed with the bit width; and the forcible halt means receives the overflow signal from the calculator in the PE at the previous stage, ignores addition results of the addition means, and transfers the overflow signal in each of the PEs at the current stage and the previous stage to the PE at the next stage.

The above-mentioned motion vector detection apparatus of the present invention is also characterized in that the restriction means compares a setting value with the smaller cumulative addition value selected by the comparison means, and halts the entire operations of the motion vector detection apparatus when the smaller cumulative addition value is smaller than the setting value.

The above-mentioned motion vector detection apparatus of the present invention is also characterized in that the restriction means comprises: a signal generation means for generating a halt signal when the smaller cumulative addition value is smaller than the setting value; and a control means for halting the supply of a clock signal to each of the PEs and the comparison means when the signal generation means generates the halt signal.

The above-mentioned motion vector detection apparatus of the present invention is also characterized by further comprising: a plurality of registers for storing data, which are provided in each of the plurality of PEs; a data transfer control circuit provided on a data bus for transmitting data of the plurality of pixels composing one block to each of the plurality of PEs; and the restriction means dividing each bit string of the plurality of registers and the data transfer control circuit into a plurality of contiguous bit strings and controlling data writing or data transferring of each of the plurality of contiguous bit strings independently.

The above-mentioned motion vector detection apparatus of the present invention is also characterized in that the restriction means generates a switch signal, so as to halt the supply of a clock signal to predetermined low-order bits of each bit string of the plurality of registers and the data transfer control circuit.

Another motion vector detection apparatus of the present invention for detecting correlation between a picture consisting of a plurality of pixels and a plurality of blocks each consisting of the same number of pixels as the picture, the plurality of blocks being included within a predetermined search area containing a larger number of pixels than the picture is characterized by comprising: a plurality of PEs which are cascade-connected, each of the plurality of PEs calculating the difference absolute value between each of the plurality of pixels included in the picture and a corresponding one of pixels included in every one of the plurality of blocks, and performing cumulative addition of the difference absolute values for every one of the plurality of blocks sequentially, each of the plurality of PEs comprising: a difference absolute value calculation means for calculating the difference between each of the plurality pixels included in the picture and a corresponding one of pixels contained in one of the plurality of blocks, and further calculating the absolute value of the difference, so as to obtain a difference absolute value; an addition means for adding the difference absolute value obtained by the difference absolute value calculation means and an output of the PE at the previous stage together, and for transferring addition results to the PE at the next stage, and the addition means provided in the PE at the later stage of the plurality of PEs having a larger bit width.

The above-mentioned motion vector detection apparatus of the present invention is also characterized in that the addition means provided in each of the plurality of PEs has the smallest bit width that does not cause an overflow.

According to the above-mentioned construction of the present invention, the restriction means puts restrictions on at least one of the calculation in the plurality of PEs and the subtraction processing in the comparison means, so that both the power consumption and the circuit scales can be reduced. In that case, when the cumulative addition value of the difference absolute values finally obtained in the comparison means is a value close to the smallest value, the block having the close value can be used as a block having sufficient correlation in detecting a motion vector so as to lower the level of the data redundancy between pictures sufficiently, and to compress the motion pictures at a high compression rate.

Since the addition means in each PE has a small bit width, the circuit scale can be small, which accordingly reduces the power consumption.

When the addition results of the adder exceed the setting value in a PE, or when low correlation is predicted before the total value is finally obtained by continuing the remaining addition, the useless addition processing of the difference absolute values in the remaining PEs is halted, which reduces the power consumption.

Furthermore, when a block having sufficiently high correlation with the previous picture block is detected, a motion vector is detected based on this block, which makes it unnecessary to detect a block having higher correlation. Consequently, the calculation of the cumulative addition value of the difference absolute values in the remaining blocks is halted, so that the number of calculations is effectively decreased, which reduces the consumption power.

In addition, the operations of the registers and the low-order bits of the data transfer control circuit are forcibly halted by means of a switching signal. This enable the choice between obtaining a desired precision with all the bits and obtaining a reduced precision with the high-order bits only. The latter processing can reduce the power consumption.

The bit width of the addition means is set larger in a PE at a later stage. Consequently, the circuit scale can be efficiently reduced, and accordingly, the power consumption is reduced, as compared with the conventional apparatus where the bit width of the addition means at the final stage is adopted in the addition means at all the other stages.

DETAILED DESCRIPTION OF THE INVENTION

Each preferred embodiment of the present invention will be described as follows with reference to the attached drawings.

(EMBODIMENT 1)

Figure 1:
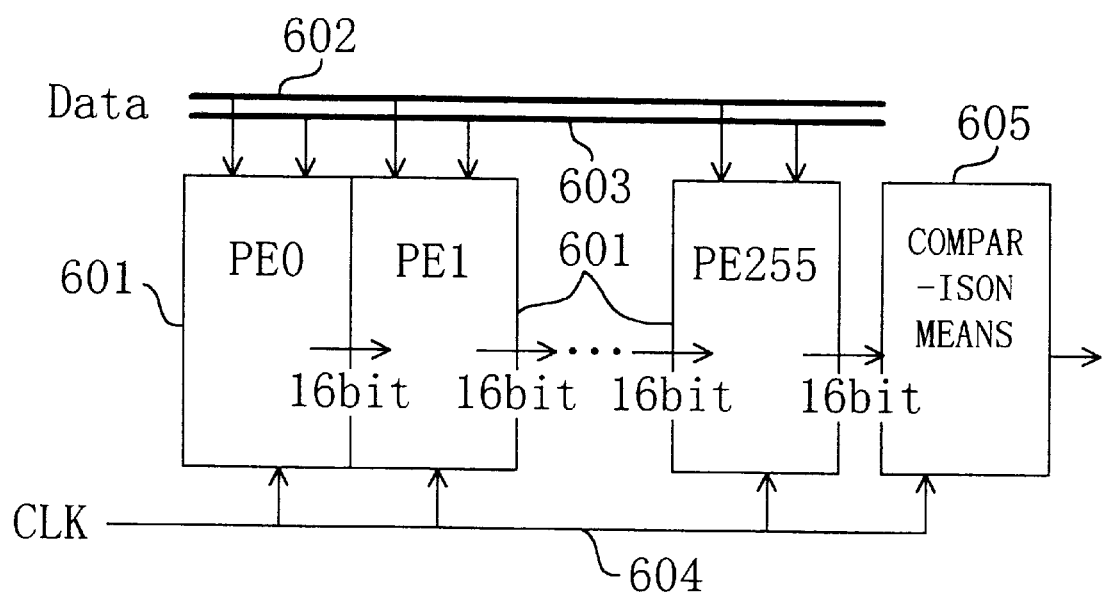
FIG. 1 shows the entire structure of the motion vector detection apparatus of the first embodiment of the present invention.
Figure 2:
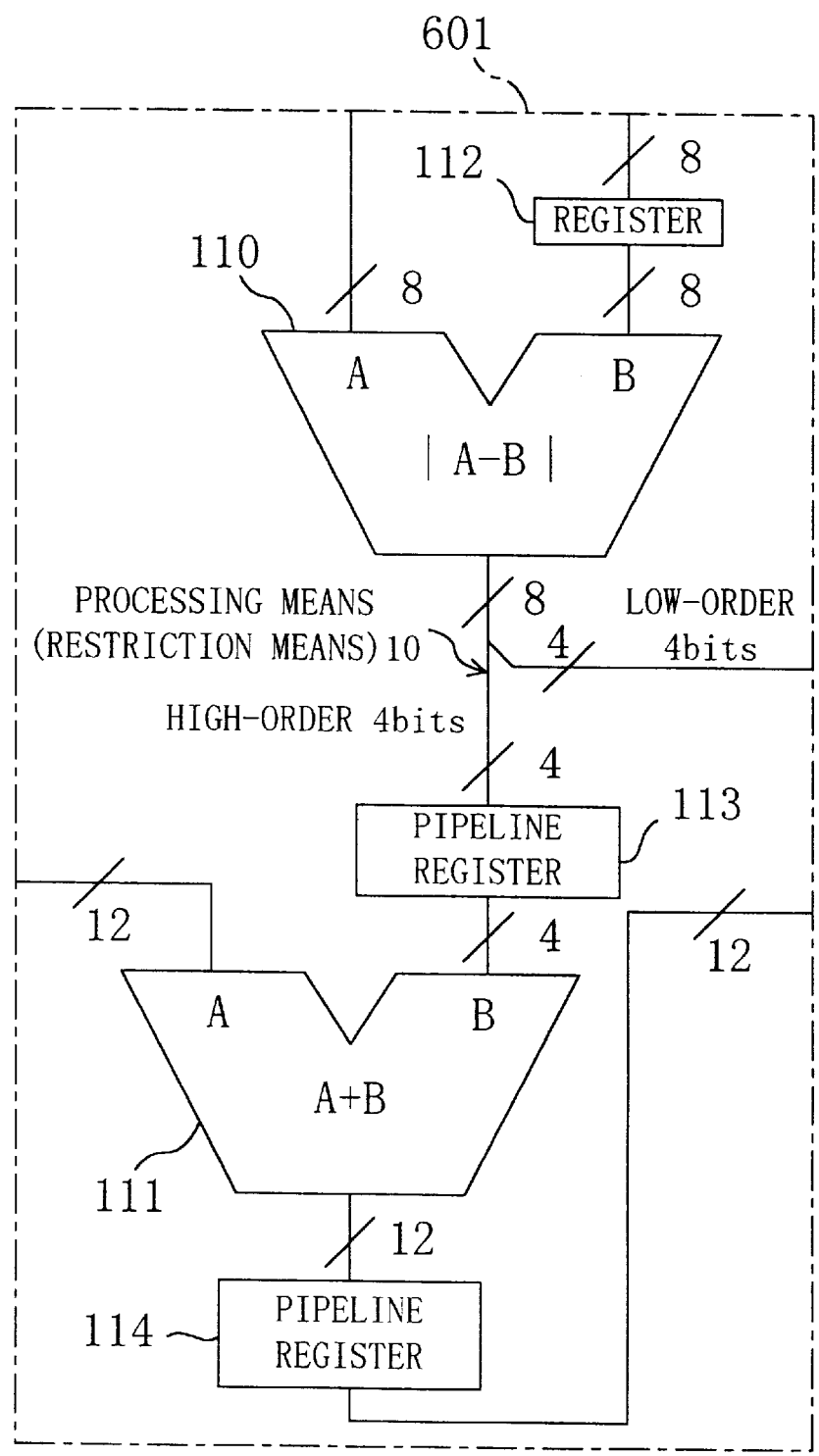
FIG. 2 shows the structure of a PE which is a component of the motion vector detection apparatus of the same.

FIGS. 1 and 2 show the motion vector detection apparatus of a first embodiment of the present invention. Since the entire structure of the apparatus shown in FIG. 1 has been described above, the following description will be focused on the internal structure of a PE which is a component of the apparatus with reference to FIG. 2.

Figure 5:
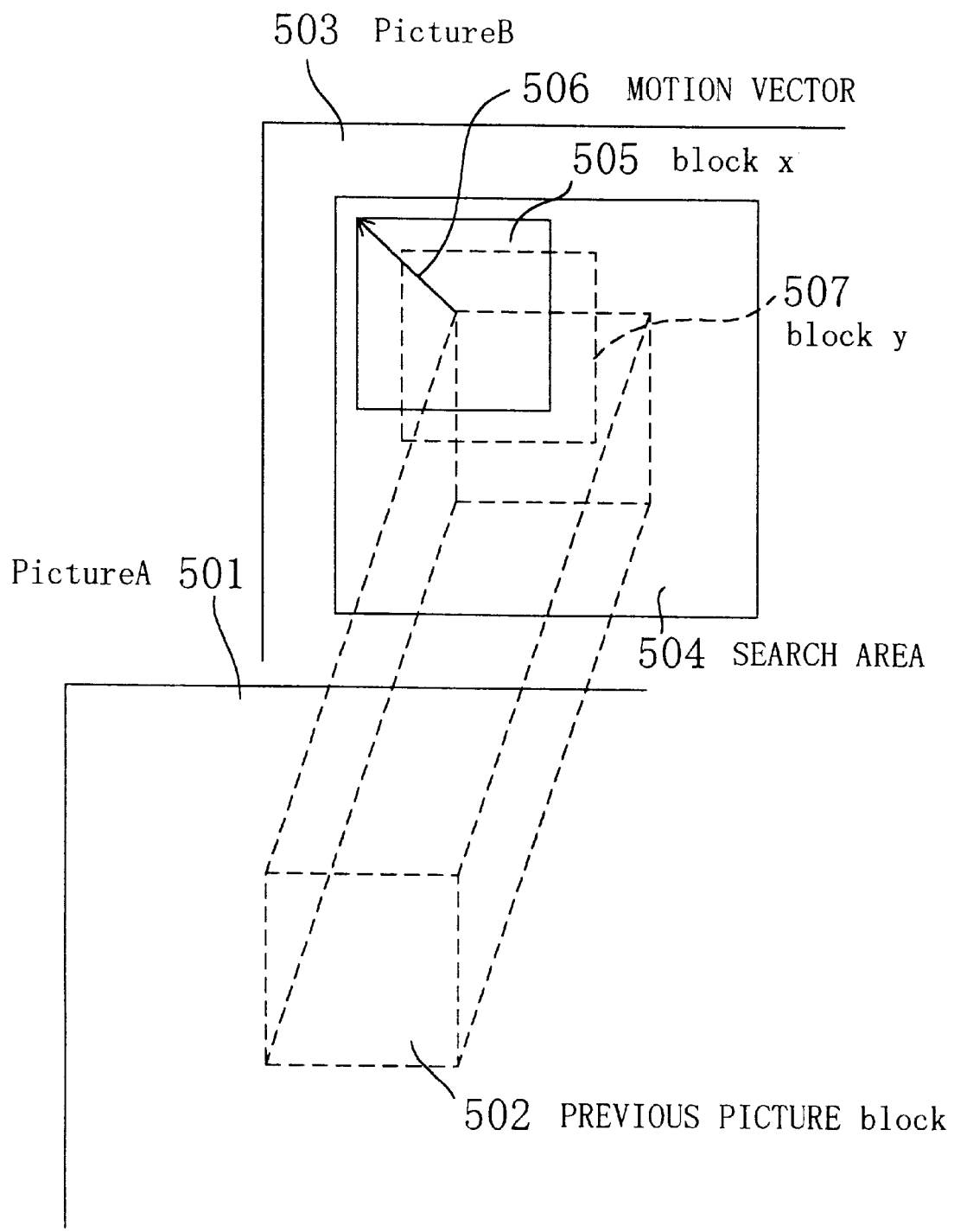
FIG. 5 shows a diagram which illustrates the block matching method.

The PE shown in FIG. 2 includes a difference absolute value calculator 110 for calculating the absolute value of a difference value so as to output an 8-bit difference absolute value, an adder (addition means) 111, a register 112 which is connected with B terminal of the difference absolute value calculator 110 and receives the pixel data of the previous picture block 502 shown in FIG. 5, a pipeline register 113 which is disposed on the side of the output of the difference absolute value calculator 110, and a pipeline register 114 which is disposed on the side of the output of the adder 111.

In each of the PEs 601 of the present embodiment, only the high-order 4 bits of an 8-bit difference absolute value are entered to the adder 111 via the pipeline register 113. Therefore, the adder 111 and the two pipeline registers 113 and 114 have 4-bit widths.

Of a difference absolute value outputted from the difference absolute value calculator 110, the low-order 4 bits are truncated and only the high-order 4 bits are entered to the adder 111, and as a result, a processing means 10 outputs a high-order 4-bit difference calculation value. The processing means 10 composes a restriction means for putting restrictions on the calculation in the adder 111 in a PE.

The operations of the motion vector detection apparatus of the present embodiment will be described as follows. The absolute value of a difference between a pixel in the previous picture block 502 stored in the register 112 and a pixel in block X 505 which spatially corresponds to the pixel is calculated in the difference absolute value calculator 110, and the high-order 4 bits of the calculated difference absolute value are stored in the pipeline register 113. The difference absolute value stored in the pipeline register 113 and an output of the adder 111 (the sum of the difference absolute values) in the PE at the previous stage are added together by the adder 111 in the PE at the current stage. The addition results are then stored in the pipeline register 114.

In each PE, the low-order 4 bits of a difference absolute value obtained in the difference absolute value calculator 110 are truncated, so that a value obtained as a result of dividing the difference absolute value of the difference absolute value calculator 110 by 16 is stored in the pipeline register 113 while the high-order 4-bit difference absolute value is given to the adder 111. Consequently, in the motion vector detection apparatus of the present embodiment, the total sum of the values each obtained as a result of dividing the difference absolute value by 16 is outputted to the PE at the final stage. As a result, the total sum has a lower precision (resolution) than its equivalent in the conventional apparatus, but is sufficiently indicative of the level of correlation, so that a motion vector obtained based on this total sum can be used for the motion compensation prediction to obtain a sufficiently high compression rate.

Another advantage of the present embodiment is that the adder 111 and the pipeline registers 113 and 114 have as small as a 4-bit width, as compared with the 8-bit width in the conventional apparatus, so that the circuit scale can be small. Furthermore, the power consumption is reduced according to the reduction of the circuit scale.

To be more specific, the circuit scales of the pipeline register 113, the adder 111, and the pipeline register 114 in the present embodiment can be 50%, 75%, and 75%, respectively, of those of their equivalents in the conventional motion vector detection apparatus.

Although the low-order 4 bits of an output of the difference absolute value calculator 110 are truncated in the present embodiment, it goes without saying that the reduction of the bit width can be also achieved by rounding off to a predetermined bit of the output.

(EMBODIMENT 2)

A second embodiment of the present invention will be described based on FIG. 3. The description of the entire structure of the motion vector detection apparatus of the present embodiment will be omitted because the structure is the same as that of the first embodiment shown in FIG. 1.

Figure 3:
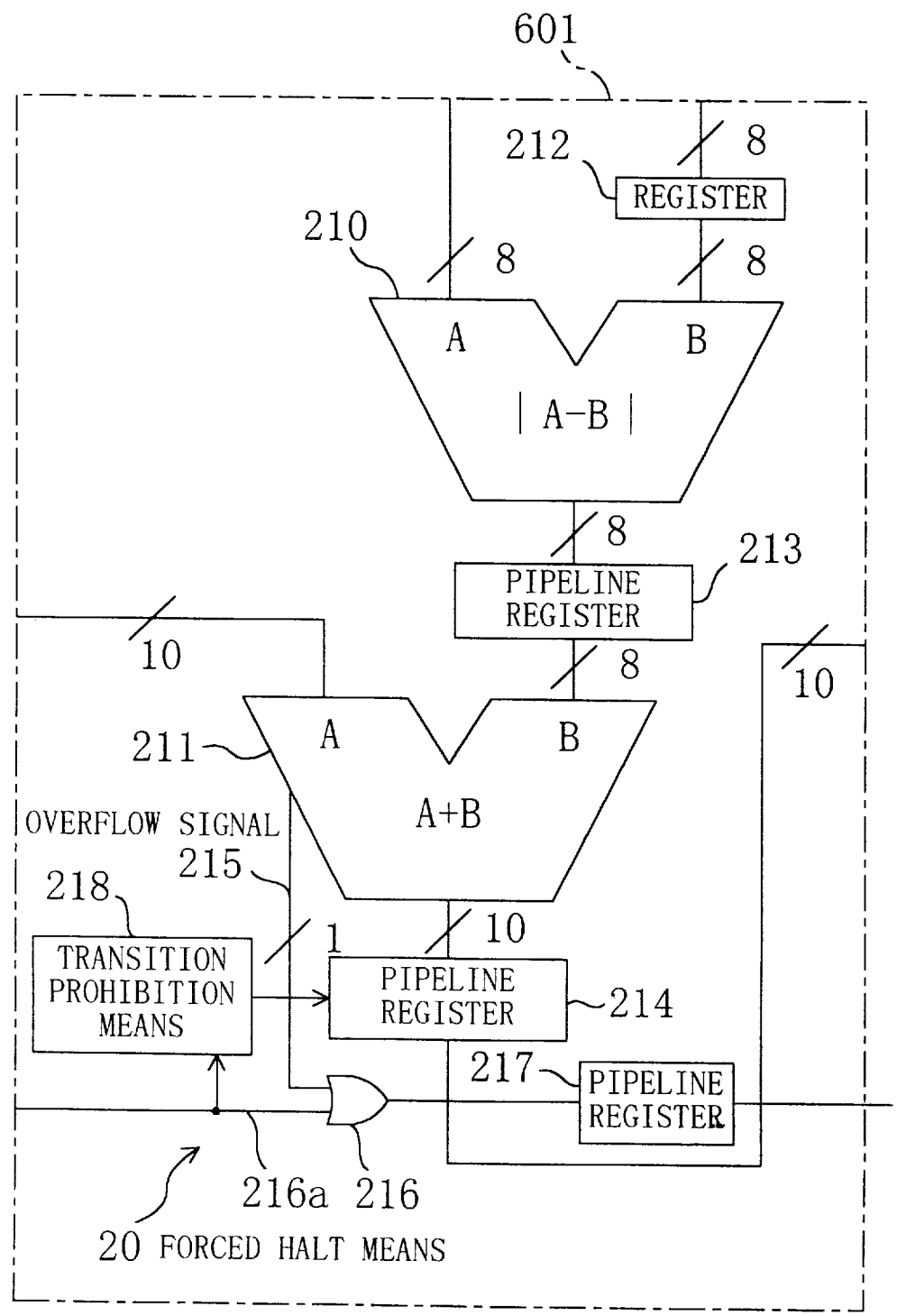
FIG. 3 shows the structure of a PE of the motion vector detection apparatus of the second embodiment of the present invention.
Figure 9:
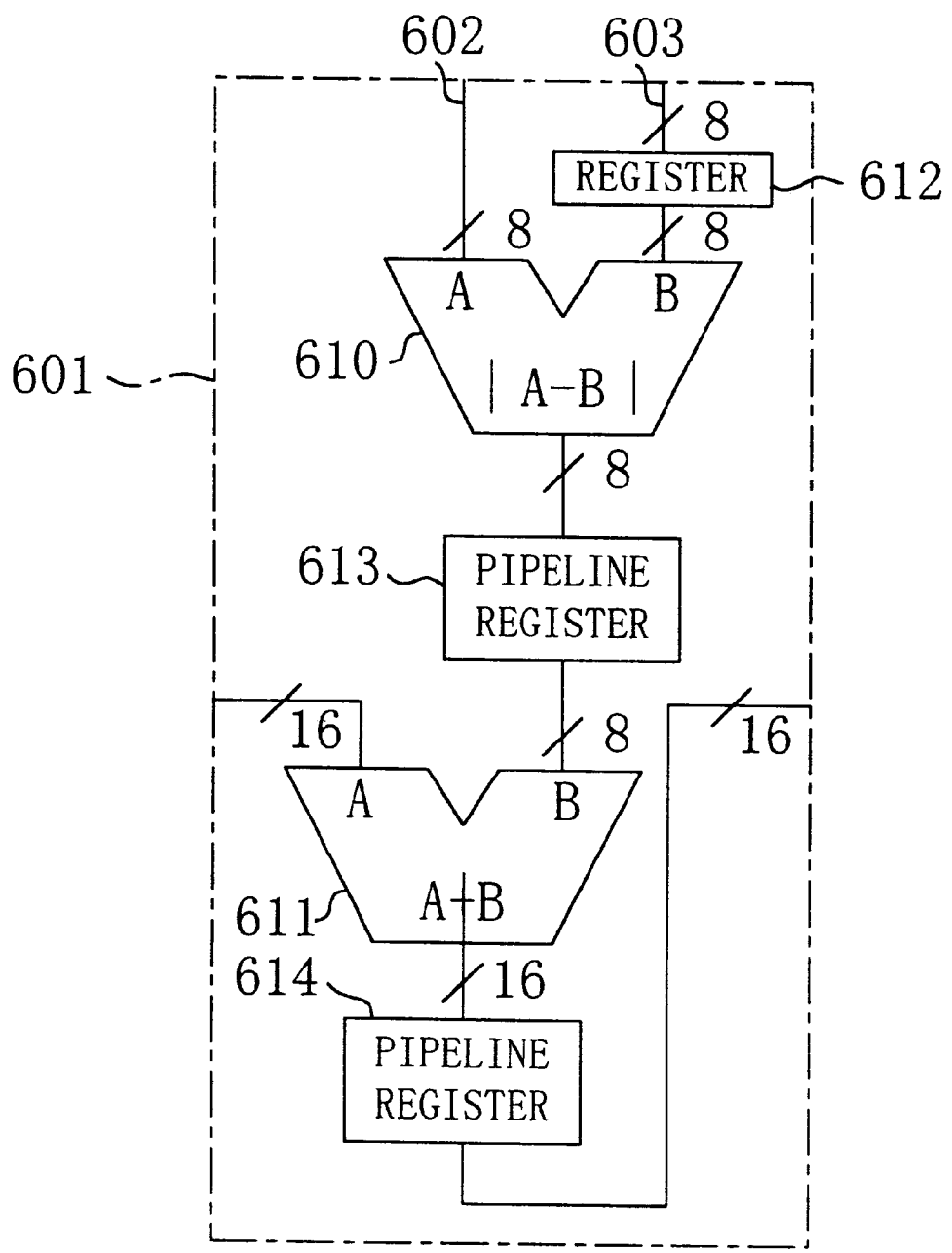
FIG. 9 shows the structure of a PE which is a component of a conventional motion vector detection apparatus.

FIG. 3 shows the internal structure of one of the PEs. The PE shown in FIG. 3 includes a difference absolute value calculator 210, an adder 211, a register 212, and pipeline registers 213 and 214. While the conventional adder 611 shown in FIG. 9 has a 16-bit width, the adder 211 of the present embodiment is composed of a calculator with a smaller bit width, such as a 10-bit width.

The adder 211 outputs an overflow signal 215 when a calculated value is larger than the maximum value (threshold value) which can be expressed in the 10-bit width. An OR circuit 216 receives the overflow signal 215 from the adder 211 and an output signal of the PE at the previous stage (not shown) via the signal path 216a, and ORs these signals. The output of the OR circuit 216 is transferred to the OR circuit in the PE at the next stage (not shown) via the pipeline register 217. A transition prohibition means 218 receives the overflow signal 215 from the adder 211 so as to prohibit the transition of the data stored in the pipeline register 214 which is at the stage following the adder 211.

When the adder 211 in a PE outputs a value larger than the above-mentioned threshold value, the transition prohibition means 218 in the PE at the next stage prohibits the transition of the data stored in the pipeline register 214 of the PE at the current stage, based on the overflow signal 215. As a result, a forced halt means 20 is formed which forcibly halts the cumulative addition of the difference absolute values in the PE at and after the next stage by ignoring the addition results of the adder 211 at the current stage, and which transfers overflow signals from the PEs at the current and previous stages to the PE at the following stage via the OR circuit 216 and the pipeline register 217.

The following is a description of the operations of the motion vector detection apparatus of the present embodiment. The adder 211 outputs the overflow signal 215 when its calculation results are equal to or larger than the threshold value, which is the maximum value that can be expressed in 10 bits. The OR circuit 216 ORs the overflow signal 215 from the adder 211 and the overflow signal 215 from the PE at the previous stage, and transfers the results to the PE at the next stage via the pipeline register 217. In each PE, when the overflow signal 215 is transferred from the PE at the previous stage, the transition prohibition means 218 prohibits the transition of the data stored in the pipeline register 214 by halting the supply of a clock signal or by another method. As a result, when the calculated value is equal to or larger than the threshold value, the calculation of the total sum hereafter is halted, which realizes the reduction of the power consumption. In the next time, the calculation of the total sum of the difference absolute values is performed with regard to each of the remaining blocks (for example, block Y 507 shown in FIG. 5) within the search area 504. Then, the displacement between the block having the smallest total sum and the previous picture block is detected as a motion vector.

When the total sum calculation is halted based on the overflow signal 215, the evaluation value outputted from the PE at the final stage becomes indefinite value. However, this indefinite evaluation value can be prevented from being mistakenly regarded as the smallest evaluation value, by making the comparison means 605 receive the overflow signal 215 and making the indefinite value be excluded from the comparison target.

When the adder 211 has a 10-bit width in the present embodiment, the circuit scales of the adder 211 and the pipeline register 214 can be 62.5% of those of their equivalents in the conventional motion vector detection apparatus.

The data transition in the pipeline register 214 in the PE at the current stage is prohibited by the overflow signal 215 in the PE at the previous stage in the present embodiment. However, by prohibiting the pipeline register 213 in the PE at the current stage from performing data transition by means of the overflow signal 215 in the PE two stages before, it becomes possible to prohibit the adder 211 from performing useless calculation in the PEs after the current stage and also to prohibit the pipeline register 213 from performing data transition. Furthermore, by prohibiting the transition of a signal entered to A terminal of the difference absolute value calculator 210 at the current stage by means of the overflow signal 215 in the PE three stages before, it becomes possible to prohibit the difference absolute value calculator 210 from performing useless calculation in the PEs after the current stage. As a result, the power consumption can be further reduced.

(EMBODIMENT 3)

A third embodiment of the present invention will be described based on FIGS. 4(a) and 4(b).

Figure 4A:
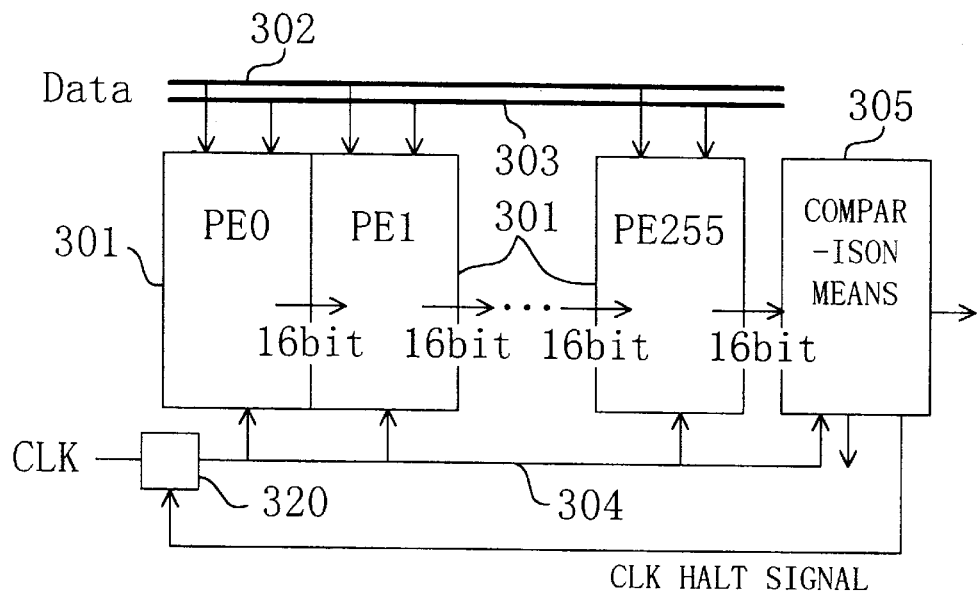
FIG. 4(a) shows the structure of the motion vector detection apparatus of the third embodiment of the present invention.
Figure 4B:
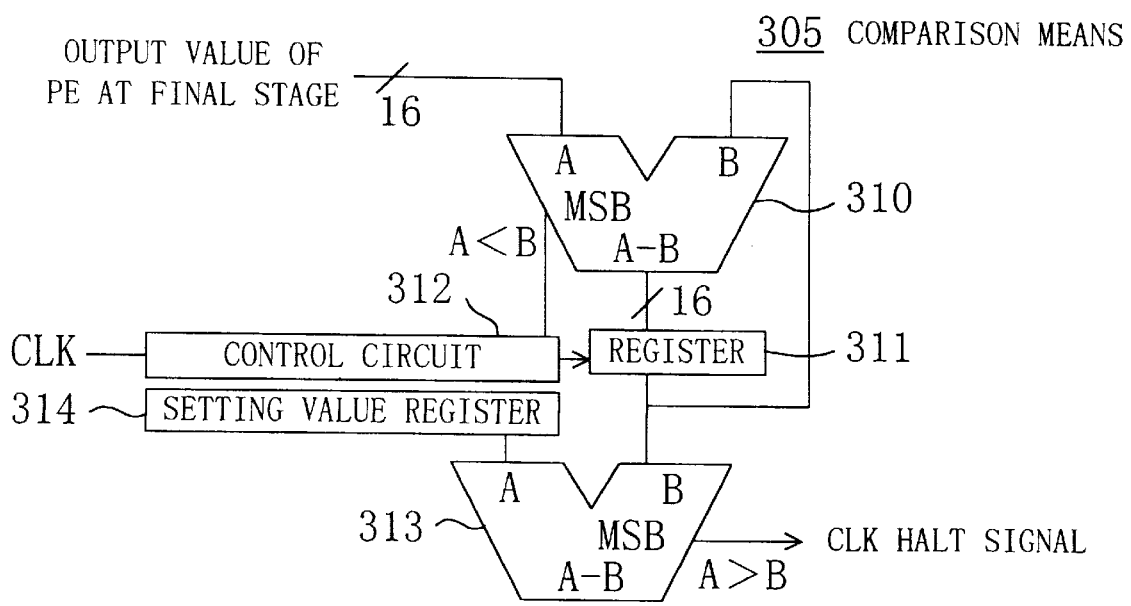
FIG. 4(b) shows the internal structure of the comparison means which is a component of the motion vector detection apparatus of the same.

FIG. 4(a) shows the entire structure of the motion vector detection apparatus of the present embodiment. This structure shows a case where each block has 256 pixels, and there are cascade-connected PEs 301 whose number is the same as that of the pixels. A bus R 302 and a bus S 303 transfer the pixel data required for the calculation in each of the PEs 301, and a clock line 304 supplies each PE with an operation clock. A comparison means 305 enters an output value of the PE at the final stage.

The present embodiment is characterized by the structures of the comparison means 305 and the clock line 304. FIG. 4(b) shows the internal structure of the comparison means 305. In the comparison means 305, a comparator 310 compares output value A of the PE at the final stage and holding value B stored in the register 311 by subtraction, and when the subtraction results (A–B) is a negative value, rewrites the contents stored in the register 311 to output value A of the PE at the final stage. The data writing of the register 311 is controlled by the control circuit 312. The control circuit 312 generates a write control signal, based on MSB (Most Significant Bit) of an output of the comparator 310 and on a clock signal supplied from the clock line 304, and outputs the control signal to the register 311.

The comparison means 305 further includes a subtracter 313 and a setting value register 314 which stores a predetermined setting value as the cumulative addition value of the difference absolute values obtained in the PE at the final stage. The subtracter 313 subtracts the smaller cumulative addition value which is actually obtained in the PE at the final stage and which is stored in the register 311, from the setting value stored in the setting value register 314. When the actually obtained cumulative addition value is smaller than the setting value, the subtracter 313 outputs the MSB of the subtraction results as a clock halt signal (halt signal). The subtracter 313 functions as a signal generation circuit.

In FIG. 4(a), a control circuit (control means) 320 is provided on the clock line 304. The control circuit 320 receives the clock halt signal from the subtracter 313 and halts the supply of the clock signal to the clock line 304. Consequently, when the clock halt signal is generated, each of the PEs 301, and the comparator 310 and the register 311 of the comparison means 305 do not receive a clock signal and halts their operations. Unlike in the present embodiment, it is possible to adopt a construction where the transfer of pixel data to each PE is halted by the halt signal of the subtracter 313. The subtracter 313 and the control circuit 320 compose a restriction means which halts the entire operations of the motion vector detection apparatus when the value stored in the register 311 (that is, the smaller cumulative addition value actually obtained in the PE at the final stage) is smaller than the setting value.

Consequently, according to the present embodiment, when the cumulative addition value actually obtained in the PE at the final stage is smaller than the setting value, the following operations of the entire apparatus are halted, and a motion vector can be detected by using the block having the cumulative addition value smaller than the setting value as the block having sufficiently high correlation with the previous picture block. Thus, in the present embodiment, when a block having sufficient correlation with the previous picture block is obtained, the calculation of the cumulative addition value of the difference absolute values in the remaining blocks within the search area 504 can be halted. As a result, the power consumption can be reduced, as compared with the conventional apparatus which always has to calculate the cumulative addition value of the difference absolute values in all the blocks within the search area 504.

(EMBODIMENT 4)

A fourth embodiment of the present invention will be described based on FIGS. 6 and 7.

Figure 6:
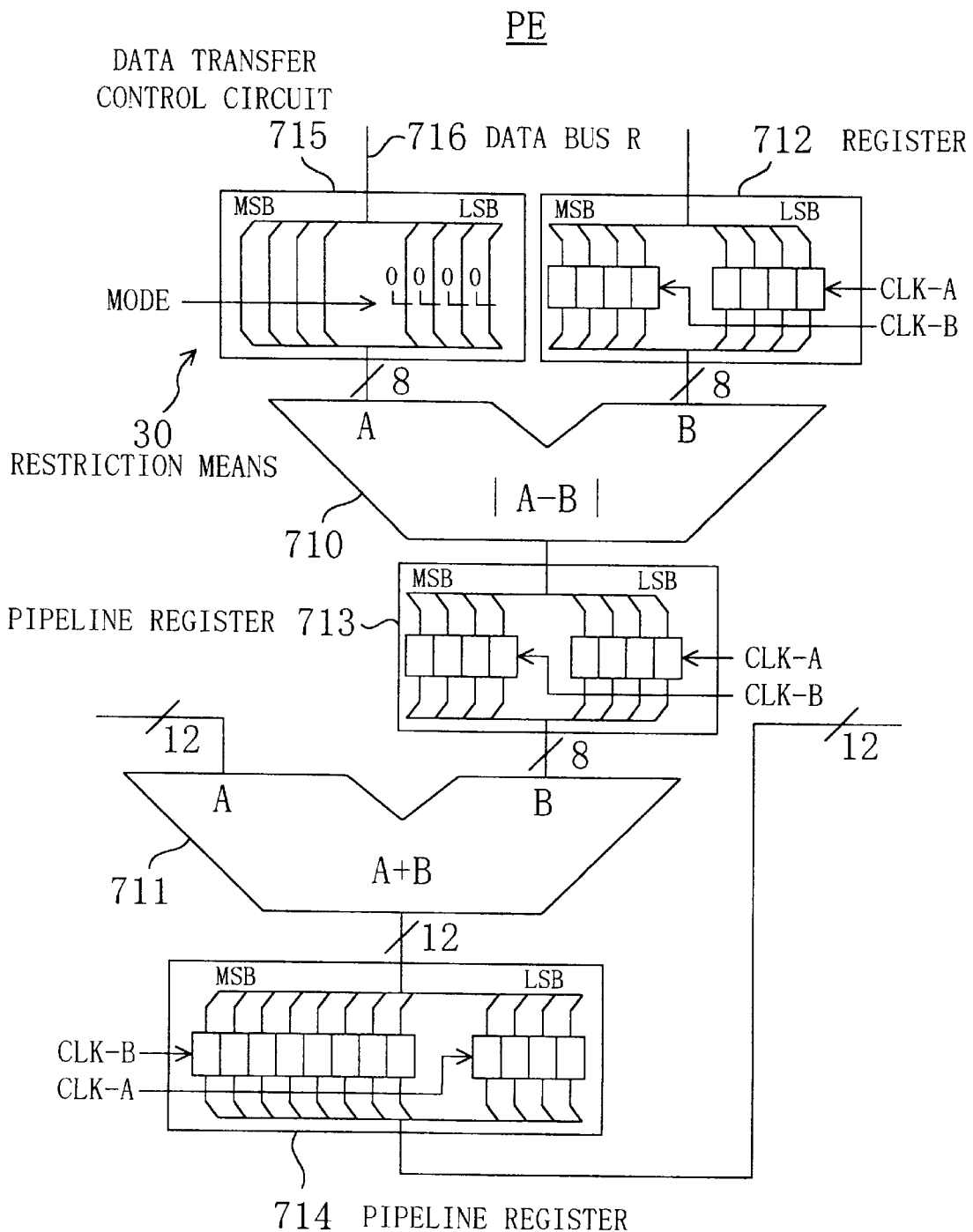
FIG. 6 shows the internal structure of a PE of the motion vector detection apparatus of the fourth embodiment of the present invention.
Figure 7:
FIG. 7 shows the control of the clock signal in the motion vector detection apparatus of the same.
Figure 7:
Figure 7:
Figure 7:

FIG. 6 shows the structure of a PE in the motion vector detection apparatus of the present embodiment. The structure includes a difference absolute value calculator 710, an adder 711, a register 712 which is disposed at the previous stage of the difference absolute value calculator 710 and which receives the pixel data of the previous picture block shown in FIG. 5, a pipeline register (register) 713 which is disposed at the stage following the difference absolute value calculator 710, a pipeline register (register) 714 which is disposed at the stage following the adder 711, and a data transfer control circuit 715 which receives the pixel data of the blocks 505 and 507 within the search area 504 shown in FIG. 5 via the data bus R 716.

In each of the registers 712, 713, and 714, picture data are written in the low-order 4-bit storage area and the high-order 4-bit storage area independently of each other by the writing signal CLK-A and the writing signal CLK-B, respectively. These two different writing signals: CLK-A and CLK-B are generated in accordance with the value ("0" or "1") of a mode signal (switch signal) set from outside as shown in FIG. 7. The writing signal CLK-A occurs only when the mode signal MODE is "0", while the writing signal CLK-B occurs when the mode signal MODE is "0" or "1". Consequently, when the mode signal MODE is "1", the registers 712–714 can prohibit the writing of data to the low-order 4-bit storage area. The low-order 4-bit storage area of each of the registers 712–714 is reset at "0" before they are started.

The data transfer control circuit 715 fixes the low-order 4 bits at either value (usually at "0") by the mode signal MODE and transfers picture data for the high-order 4 bits on the data bus R to the difference absolute value calculator 710.

The above-mentioned structure composes a restriction means 30 which controls the wiring of data to the high-order 4 bits and the low-order 4 bits of the registers 712, 713, and 714 separately from each other by the two different writing signals: CLK-A and CLK-B, and also controls the transfer of the high-order 4 bits and the low-order 4 bits of the data transfer control circuit 715 independently of each other by the mode signal MODE.

In the motion detection which deals with natural pictures such as the MPEG standard, even if the low-order bits are ignored, almost the same level of a precision as the case where all the bits are used can be obtained, so that the picture quality is hardly affected. When the motion detection dealing with natural pictures is performed in the present embodiment, the operation of the low-order 4 bits of each of the registers 712–714 and the data transfer control circuit 715 can be halted, so as to reduce the power consumption without losing satisfactory picture quality.

In each of the registers 712–714 and the data transfer control circuit 715, each bit string is divided into low-order 4 bits and high-order 4 bits; however, a more minute control can be realized by dividing the bit string into 3 or more.

(EMBODIMENT 5)

Figure 8A:
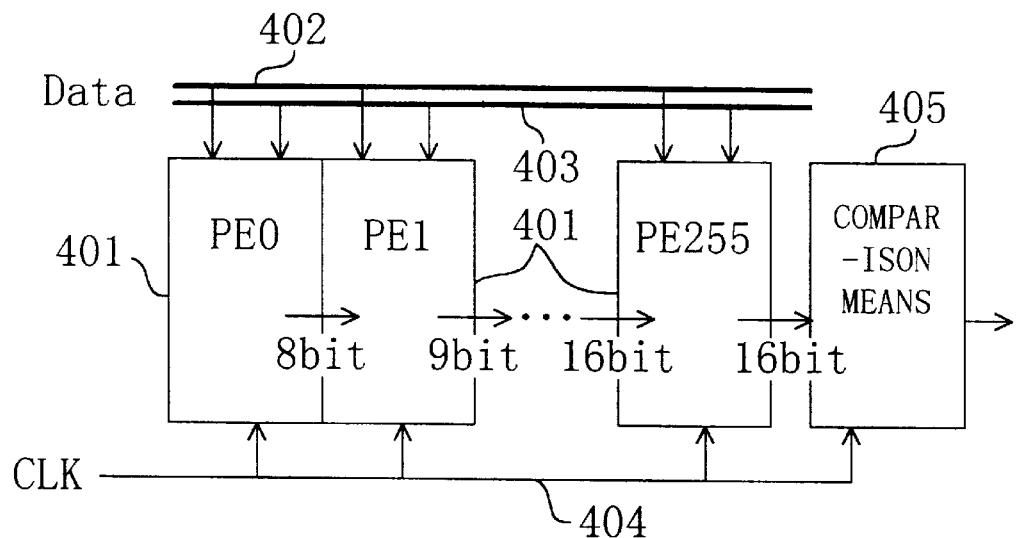
FIG. 8(a) shows the entire structure of the motion vector detection apparatus of the fifth embodiment of the present invention.

Finally, a fifth embodiment of the present invention will be described based on FIGS. 8(a) and 8(b). FIG. 8(a) shows the entire structure of the motion vector detection apparatus of the present embodiment. In the structure, each block has 256 pixels, and there are cascade-connected 256 PEs 401, a bus R 402 and a bus S 403 for transferring data required for the calculation in each of the PEs 401, a clock line 404 for supplying each PE with an operation clock, and a comparison means 405 for receiving an output of the PE at the final stage.

The present embodiment is characterized by the internal structure of each PE. All the addition means (the adder 111 shown in FIG. 2) in the PEs 401 have different bit widths from each other: the adder 111 in the PE at a later stage has a larger bit width. In other words, in each PE, the dynamic range of the data to be transferred from the adder 111 to the PE at the next stage is set larger in the PE at a later stage. Since the operations proceed normally unless there is an overflow, it is possible to modify the calculation precision in each PE. The dynamic range D of the adder 111 at each stage (i) when the pixel data have 8 bits can be expressed by the following equation:

$$D = \log_2(255^{(i+1)}) \quad i=0, 1, 2, \ldots, 255$$

Consequently, the smallest bit width of the data to be transferred to the PE in the following stage is an integer to which the value D is raised. The results are shown in FIG. 8(b).

In the present embodiment, nine different PEs which output data with a precision of 8, 9, 10, 11, 12, 13, 14, 15, and 16 bits, respectively, are realized by cascade-connecting them as shown in FIG. 8(a).

According to the above-mentioned structure, the number of bits in the adder and the pipeline register (the adder 111 and the pipeline register 114 shown in FIG. 2) can be reduced, as compared with the conventional structure. As a result, both the circuit scale and the power consumption can be reduced.

Figure 8B:
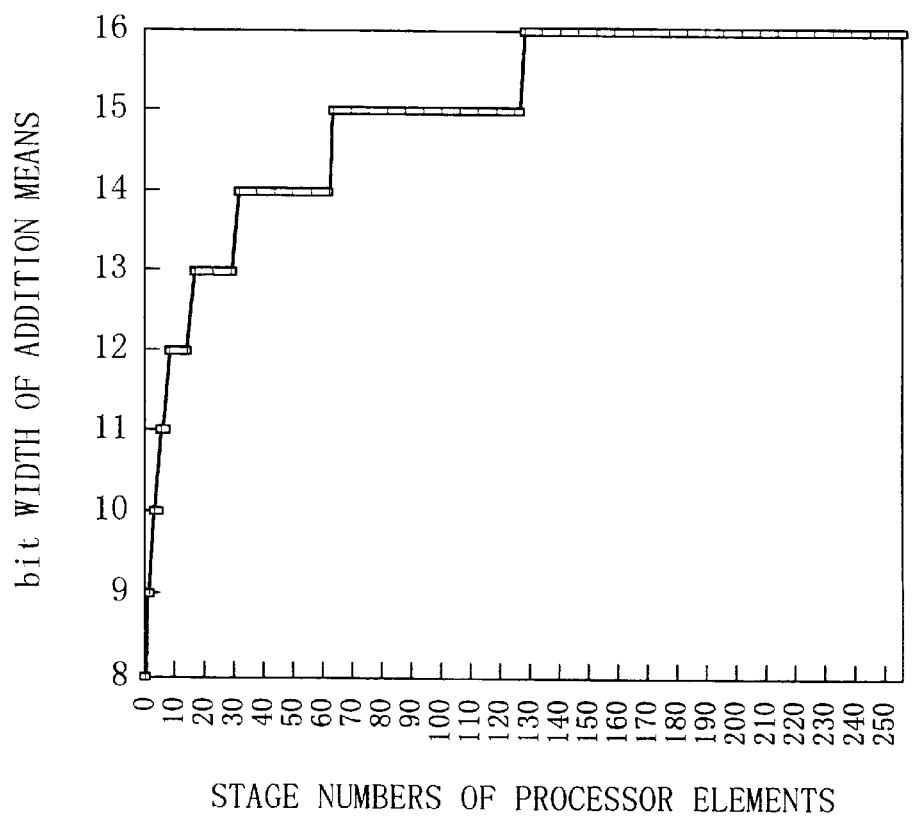
FIG. 8(b) shows a graph indicating the required number of bits in the adder in each PE.

In the present embodiment, as apparent from FIG. 8(b), the circuit scales of the adder 111 and the pipeline register 114 in each PE can be about 90% of those of their equivalents in the conventional motion vector detection apparatus.

Each of the above-mentioned embodiments can obtain the effects of reducing the circuit scales and the power consumption independently, so that any of the embodiments can be combined to enhance the effects.

What is claimed is:

1. A motion vector detection apparatus for detecting correlation between a picture consisting of a plurality of pixels and a plurality of blocks each consisting of a same number of pixels as said picture, the plurality of blocks being included within a predetermined search area containing a larger number of pixels than said picture, said motion vector detection apparatus comprising:

a plurality of processor elements which are cascade-connected, each of said plurality of processor elements calculating a difference absolute value between each of the plurality of pixels included in said picture and a corresponding one of pixels included in every one of the plurality of blocks, and performing cumulative addition of the difference absolute values for every one of the plurality of blocks sequentially;

a comparison means for repeatedly comparing cumulative addition values of the difference absolute values of two of the plurality of blocks by subtraction, the cumulative addition values being obtained in a processor element at a final stage, and for repeatedly selecting a smaller cumulative addition value; and a restriction means for placing restrictions on calculation of at least one of said comparison means and said plurality of processor elements, so as to give a cumulative addition value finally obtained in said comparison means a possibility of becoming a sufficiently small cumulative addition value even if the cumulative addition value is not smallest.

2. The motion vector detection apparatus of claim 1, wherein each of said plurality of processor elements comprises:

a difference absolute value calculation means for calculating a difference between each of the plurality of pixels included in said picture and a corresponding one of pixels contained in one of the plurality of blocks, and further calculating an absolute value of the difference, so as to obtain a difference absolute value having a predetermined number of bits;

an addition means for adding the difference absolute value obtained by said difference absolute value calculation means and an output of a processor element at a previous stage together, and for transferring addition results to a processor element at a next stage; and said restriction means being composed of a processing means for truncating or rounding predetermined low-order bits of the difference absolute value obtained by said difference absolute value calculation means, so as to obtain the difference absolute value having high-order bits.

3. The motion vector detection apparatus of claim 1, wherein each of said plurality of processor elements comprises:

a difference absolute value calculation means for calculating a difference between each of the plurality of pixels included in said picture and a corresponding one of pixels contained in one of the plurality of blocks, and further calculating an absolute value of the difference, so as to obtain a difference absolute value;

an addition means for adding the difference absolute value obtained by said difference absolute value calculation means and an output of a processor element at a previous stage together, and for transferring addition results to a processor element at a next stage, said addition means being composed of a calculator whose bit width is small; and said restriction means comprising said calculator which composes said addition means and a forced halt means for forcibly halting the cumulative addition of the difference absolute values in processor elements at following stages when a value calculated by said calculator is larger than a maximum value which can be expressed with said bit width.

4. The motion vector detection apparatus of claim 3, wherein said calculator whose bit width is small is composed of a calculator which outputs an overflow signal when a calculated value is larger than the maximum value which can be expressed with said bit width; and said forced halt means receives the overflow signal from said calculator in a processor element at a previous stage, ignores addition results of said addition means, and transfers the overflow signal in each of processor elements at a current stage and a previous stage to a processor element at a next stage.

5. The motion vector detection apparatus of claim 1, wherein said restriction means compares a setting value with the smaller cumulative addition value selected by said comparison means, and halts entire operations of said motion vector detection apparatus when the smaller cumulative addition value is smaller than the setting value.

6. The motion vector detection apparatus of claim 5, wherein said restriction means comprises:

a signal generation means for generating a halt signal when the smaller cumulative addition value is smaller than the setting value; and a control means for halting supply of a clock signal to each of said plurality of processor elements and said comparison means when said signal generation means generates the halt signal.

7. The motion vector detection apparatus of claim 1 further comprising:

a plurality of registers for storing data, said plurality of registers being provided in each of said plurality of processor elements;

a data transfer control circuit provided on a data bus for transmitting data of the plurality of pixels composing one block to each of said plurality of processor elements; and said restriction means dividing each bit string of said plurality of registers and said data transfer control circuit into a plurality of contiguous bit strings and controlling data writing or data transferring of each of the plurality of contiguous bit strings independently.

8. The motion vector detection apparatus of claim 7, wherein said restriction means generates a switch signal, so as to halt supply of a clock signal to predetermined low-order bits of each bit string of said plurality of registers and said data transfer control circuit.

9. A motion vector detection apparatus for detecting correlation between a picture consisting of a plurality of pixels and a plurality of blocks each consisting of a same number of pixels as said picture, the plurality of blocks being included within a predetermined search area containing a larger number of pixels than said picture, said motion vector detection apparatus comprising:

a plurality of processor elements which are cascade-connected, each of said plurality of processor elements calculating a difference absolute value between each of the plurality of pixels included in said picture and a corresponding one of pixels included in every one of the plurality of blocks, and performing cumulative addition of the difference absolute values for every one of the plurality of blocks sequentially, each of said plurality of processor elements comprising:

a difference absolute value calculation means for calculating a difference between each of the plurality of pixels included in said picture and a corresponding one of pixels contained in one of the plurality of blocks, and further calculating an absolute value of the difference, so as to obtain a difference absolute value;

an addition means for adding the difference absolute value obtained by said difference absolute value calculation means and an output of a processor element at a previous stage together, and for transferring addition results to a processor element at a next stage, and said addition means provided in a processor element at a later stage of said plurality of processor elements having a larger bit width.

10. The motion vector detection apparatus of claim 9, wherein said addition means provided in each of said plurality of processor elements has a smallest bit width that does not cause an overflow.

* * * * *